United States Patent
Kim et al.

(10) Patent No.: US 10,417,829 B2
(45) Date of Patent: Sep. 17, 2019

(54) METHOD AND APPARATUS FOR PROVIDING REALISTIC 2D/3D AR EXPERIENCE SERVICE BASED ON VIDEO IMAGE

(71) Applicant: ELECTRONICS AND TELECOMMUNICATIONS RESEARCH INSTITUTE, Daejeon (KR)

(72) Inventors: Ho Won Kim, Seoul (KR); Byung Ok Han, Daejeon (KR); Yu Gu Jung, Daejeon (KR); Jae Hwan Kim, Daejeon (KR); Ji Hyung Lee, Daejeon (KR); Chang Joon Park, Daejeon (KR); Gil Haeng Lee, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 20 days.

(21) Appl. No.: 15/888,936

(22) Filed: Feb. 5, 2018

(65) Prior Publication Data

US 2019/0164346 A1     May 30, 2019

(30) Foreign Application Priority Data

Nov. 27, 2017 (KR) .................. 10-2017-0159552
Jan. 30, 2018 (KR) .................. 10-2018-0011055

(51) Int. Cl.
*G06T 19/00* (2011.01)
*G06T 19/20* (2011.01)
*G06T 15/00* (2011.01)
*G06F 3/01* (2006.01)

(52) U.S. Cl.
CPC ............ *G06T 19/006* (2013.01); *G06F 3/011* (2013.01); *G06T 15/005* (2013.01); *G06T 19/20* (2013.01)

(58) Field of Classification Search
CPC ........ G06T 19/006; G06T 19/20; G06F 3/011
See application file for complete search history.

(56) References Cited

U.S. PATENT DOCUMENTS 9,699,438 B2 * 7/2017 Walsh ................... G06T 19/006
9,928,653 B2 * 3/2018 Atsmon ................ G06T 19/006
2010/0134494 A1   6/2010 Lim et al.
(Continued)

FOREIGN PATENT DOCUMENTS

KR     20120092352 A    8/2012
KR     10-1530634 B1    6/2015
(Continued)

*Primary Examiner* — Ryan R Yang

(57) ABSTRACT

The present invention relates to a method and apparatus for providing a realistic 2D/3D AR experience service based on a video. Particularly, the present invention provides a method of providing a realistic AR service with high quality based on AR by using a 2D video image and 3D information in association thereto at the same time, filming a cybernaut and AR content by using two sensors having viewpoints different from each other, and arranging 2D/3D content being an object to be matched within the AR content and which has a 3D position different to a position of the cybernaut in association with a dynamic 3D position of the cybernaut and with a dynamic viewpoint of a service sensor.

19 Claims, 7 Drawing Sheets

(56) References Cited

U.S. PATENT DOCUMENTS

| | | | |
|---|---|---|---|
| 2013/0120365 A1 | 5/2013 | Lee et al. | |
| 2014/0168217 A1* | 6/2014 | Kim | G06T 13/40 345/420 |
| 2016/0012640 A1 | 1/2016 | Abraham | |
| 2016/0093099 A1* | 3/2016 | Bridges | H04N 13/221 348/50 |
| 2017/0053456 A1 | 2/2017 | Cho et al. | |
| 2017/0358138 A1* | 12/2017 | Dack | G06T 19/006 |
| 2018/0101989 A1* | 4/2018 | Frueh | G06F 16/5838 |

FOREIGN PATENT DOCUMENTS

| | | |
|---|---|---|
| KR | 10-1707707 B1 | 2/2017 |
| KR | 101723828 B1 | 4/2017 |

\* cited by examiner

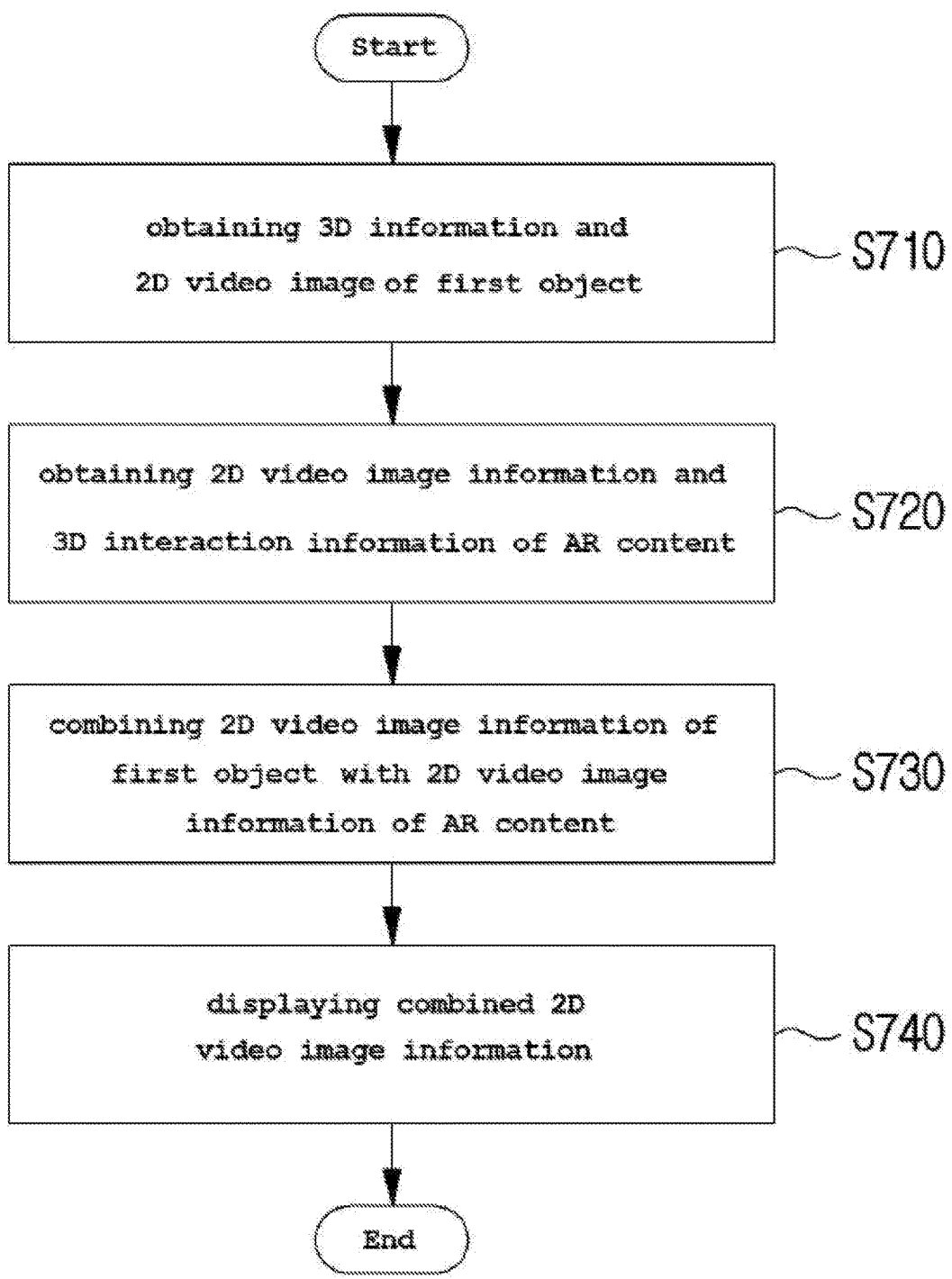

METHOD AND APPARATUS FOR PROVIDING REALISTIC 2D/3D AR EXPERIENCE SERVICE BASED ON VIDEO IMAGE

CROSS REFERENCE TO RELATED APPLICATION

The present application claims priority to Korean Patent Application No. 10-2017-0159552, filed Nov. 27, 2017 and No. 10-2018-0011055, filed Jan. 30, 2018, the entire contents of which is incorporated herein for all purposes by this reference.

BACKGROUND OF THE INVENTION

Field of the Invention

The present invention relates generally to a method of providing realistic AR experience service using an AR technique by displaying AR content using a smart terminal or a large mirror type TV which supports an AR function. More particularly, the present invention relates to a method of enabling a cybernaut to virtually take a photo or to experience realistic interaction with a famous person such as K-pop star through an AR function providing display.

Description of the Related Art

In a conventional AR service providing method using an AR technique to enable a cybernaut virtually to take a photo or to experience realistic interaction with a famous person such as K-Pop star through an AR function providing display, the method may be implemented by using a 3D approaching method and a 2D approaching method according to a method of processing AR content that interacts with the cybernaut and becomes an object to be synthesized as AR.

Herein, the AR content is content produced in advance for providing realistic AR experience to the cybernaut, and may include photos, videos, 3D characters, and motion information of stars who are entities that the cybernaut will experience. An AR service may be a service providing the cybernaut with a realistic experience by synthesizing as AR, the AR content on a live input image or video of the cybernaut or by synthesizing as AR the AR content by recognizing a neighbor space where the cybernaut is positioned.

First, a 3D approaching method uses a method of synthesizing as AR a 3D character such as animation character produced by using 3D authoring tool such as Maya by using a computer graphic method, and providing interaction by using 3D information of the cybernaut. In the above method, real time 3D interaction processing may be easily performed by using a sensor such as Kinect providing real time 3D information of the cybernaut such as a position or posture of a user. In addition, according to the quality of 3D modeling, when character rigging and 3D rendering are used for an AR service, a realistic AR experience may be provided with the quality identical to digital content providing a conventional character since the 3D character is a 3D character of a digital space.

However, in order to provide an AR service based on a real person (e.g. a K-pop star) based on the above method, a 3D avatar of the real person is generated by using 3D scanning or 3D modeling and using an authoring tool. A lot of work time is required for generating such a 3D avatar, and there is a limit to perform realistic synthesizing as AR due to technical restrictions in 3D digitalizing processing such as 3D modeling, character rigging, 3D rendering, etc. for various factors such as precise shape expression, facial expression, hair style, etc.

In addition, in a 2D approaching method, filming a real person or background may be performed for object to be synthesized as AR which is used for the AR service. Herein, the AR service may be provided by simply synthesizing a 2D video from which an object to be synthesized as AR is separated by using a chroma key method with a specific layer of a foreground or background image based on a pre-defined experiential position of a cybernaut. In one embodiment, the 2D approaching method is a method that is widely used in interactive theme parks. In the above method, a captured image of the real person (e.g. a K-pop star) described above is synthesized as it is at a pre-defined position in the AR content, thus the object to be provided as the AR service through a display unit may have high reality from a viewpoint of the cybernaut. However, there is a limit to provide 3D interaction with the cybernaut. In addition, the most realistic AR experience may be provided when a position of a camera used when filming the AR content and a position of a camera when providing AR service are identical, and a position of an object to be synthesized as AR and a position of the cybernaut are positioned at a pre-defined position in a content scenario. In other words, AR content using the 2D approaching method is provided as service at a position and story pre-defined when producing the AR content regardless of behavior or a position of the cybernaut, thus the cybernaut may position or pose himself or herself according to a flow of the AR content.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to provide a method and apparatus for providing a realistic AR experience based on a video.

Another object of the present invention is to provide a method and apparatus for providing a realistic 2D/3D AR experience based on a video.

Technical problems obtainable from the present invention are not limited by the above-mentioned technical problems, and other unmentioned technical problems may be clearly understood from the following description by those having ordinary skill in the technical field to which the present invention pertains.

In order to achieve the above object, according to one aspect of the present invention, there is provided a method of providing an augmented reality (AR) service. The method comprising: obtaining 3D information and 2D video image information of a first object; obtaining 2D video image information and 3D interaction information of AR content based on the first object; combining the 2D video image information of the first object with the 2D video image information of the AR content; and displaying the combined 2D video image information, a 3D space information of the first object is determined based on the 3D information and the 2D video image information of the first object, a 3D space information of the AR content is adjusted based on the determined 3D position of the first object, and the 2D video image information of the AR content is combined with the 2D video image information of the first object based on the adjusted 3D space information of the AR content.

In order to achieve the above object, according to one aspect of the present invention, there is provided an apparatus for providing an AR service. The apparatus comprising: a live RGBD processing unit, an AR content processing unit, a 3D interaction processing unit, and an AR rendering processing unit. 3D information and 2D video image information of a first object is obtained by the live RGBD processing unit, a 3D space information of the first object is determined based on the 3D information and the 2D video image information of the first object, 2D video image information and 3D interaction information of AR content is obtained by the AR content processing unit, a 3D space information of the AR content is adjusted based on the determined 3D space information of the first object, and the 2D video image information of the first object and the 2D video image information of the AR content are combined by the AR rendering processing unit, the 2D video image information of the AR content is combined with the 2D video image information of the first object based on the adjusted 3D space information of the AR content.

In order to achieve the above object, according to one aspect of the present invention, there is provided an apparatus for providing an AR service, the apparatus comprising: a live RGBD input sensor, an AR content unit, a realistic AR experience processing unit, and a display unit. The realistic AR experience processing unit obtains 3D information and 2D video image information of a first object from the live RGBD input sensor, wherein 3D space information of the first object is determined based on the 3D information and the 2D video image information of the first object, the realistic AR experience processing unit obtains 2D video image information and 3D interaction information of AR content from the AR content unit, wherein 3D space information of the AR content is adjusted based on the determined 3D space information of the first object, the realistic AR experience processing unit combines the 2D video image information of the first object with the 2D video image information of the AR content, the 2D video image information of the AR content is combined with the 2D video image information of the first object based on the adjusted 3D space information of the AR content, and the display unit displays the combined 2D video image information.

In addition, the following matters are commonly applicable to the method of feeding back the CSI and the UE device in the wireless communication system.

In order to achieve the above object, according to one aspect of the present invention, the 3D space information of the first object includes at least one of a 3D position of the first object, a posture of the first object, an angle of the first object, a direction of the first object and a size of the first object, 3D space information of the AR content includes at least one of a 3D position of the AR content, a posture of the AR content, an angle of the AR content, a direction of the AR content and a size of the AR content.

In order to achieve the above object, according to one aspect of the present invention, the 3D space information of the AR content is adjusted based on the determined 3D space information of the first object when environment information of a first sensor obtaining the first object is different from environment information of a second sensor obtaining the second object.

In order to achieve the above object, according to one aspect of the present invention, the environment information of the first sensor includes at least one of information related to a position, angle and direction where the first sensor obtains the information of the first object, and the environment information of the second sensor includes at least one of information related to a position, angle and direction where the second sensor obtains the information of the AR content.

In order to achieve the above object, according to one aspect of the present invention, the first object is provided with a 3D interaction service based on the 3D interaction information of the AR content.

In order to achieve the above object, according to one aspect of the present invention, the 3D interaction service is a service provided in association with the combined 2D video image information.

In order to achieve the above object, according to one aspect of the present invention, the 3D information of the first object is information obtained based on at least one of a depth image and skeleton information.

In order to achieve the above object, according to one aspect of the present invention, when the first sensor and the second sensor are sensors different from each other, the 3D information and the 2D video image information of the first object is obtained based on a first coordinate system, and the 2D video image information and the 3D interaction information of the AR content is obtained based on a second coordinate system.

In order to achieve the above object, according to one aspect of the present invention, the first coordinate system and the second coordinate system are transformed into the same third coordinate system, and the 3D space information of the first object and the 3D space information of the AR content are determined based on the third coordinate system.

In order to achieve the above object, according to one aspect of the present invention, further comprising: generating an adjustment line based on the 3D space information of the first object, the 3D space information of the AR content is adjusted by the 3D space information of the first object based on the generated adjustment line.

In order to achieve the above object, according to one aspect of the present invention, when the 3D space information of the first object is updated, the 3D space information of the AR content is automatically updated based on the updated 3D space information of the first object.

In order to achieve the above object, according to one aspect of the present invention, the combining of the 2D video image information of the first object with the 2D video image information of the AR content includes: synthesizing as AR based on depth information of the 2D video image information of the first object and depth information of the 2D video image information of the AR content.

In order to achieve the above object, according to one aspect of the present invention, the 2D video image information of the first object and the 2D video image information of the AR content are synthesized as AR in consideration of occlusion and visibility.

In order to achieve the above object, according to one aspect of the present invention, the combined 2D video image information is displayed through a head mounted display (HMD).

According to the present invention, depth image information can be additionally obtained based on a 2D approaching method when filming AR content that is to become an object to be synthesized as AR for an AR service.

According to the present invention, a method of additionally processing 3D information of the object to be synthesized as AR based on depth information can be provided.

According to the present invention, a method of associating 2D and 3D AR content information with a position of a camera used when providing an AR service, an experiential space, a position of a cybernaut, and a lighting environment can be provided.

According to the present invention, there can be provided high quality 3D real experience service in which 3D interaction of a 3D approaching method is available by associating with 3D information of the cybernaut even though an image synthesized as AR using the 2D approaching method is synthesized with a 2D video.

According to the present invention, there can be provided 3D interaction with the cybernaut by using time and cost required for manufacturing AR content for conventional an AR service based on 2D content, and there can also be provided a 3D real experience service supporting natural synthesizing as AR according to a lighting environment of the experiential space.

According to the present invention, there can be provided clear visible discrimination within an AR service provided to the cybernaut compared to real experience based on an avatar synthesized as AR, or based on 2D video synthesized as AR, which is based on a conventional layer.

According to the present invention, there can be provided an AR service providing 3D interaction with the cybernaut based on a 3D avatar compared to image quality using a conventional 2D approaching method.

According to the present invention, since there is no AR service in which advantages of a method based on a 2D video and advantages of a method based on a 3D avatar are combined, various embodiments purposed in the present invention can be applied by using a method of visually providing AR service to the cybernaut.

According to the present invention, an implementable embodiment with a simple configuration can be provided by using the above AR service.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The above and other objects, features and other advantages of the present invention will be more clearly understood from the following detailed description when taken in conjunction with the accompanying drawings, in which:

FIG. 7 is a view showing a flowchart of a method of providing an AR service according to an embodiment of the present invention.

DETAILED DESCRIPTION OF THE INVENTION

Figure 1:
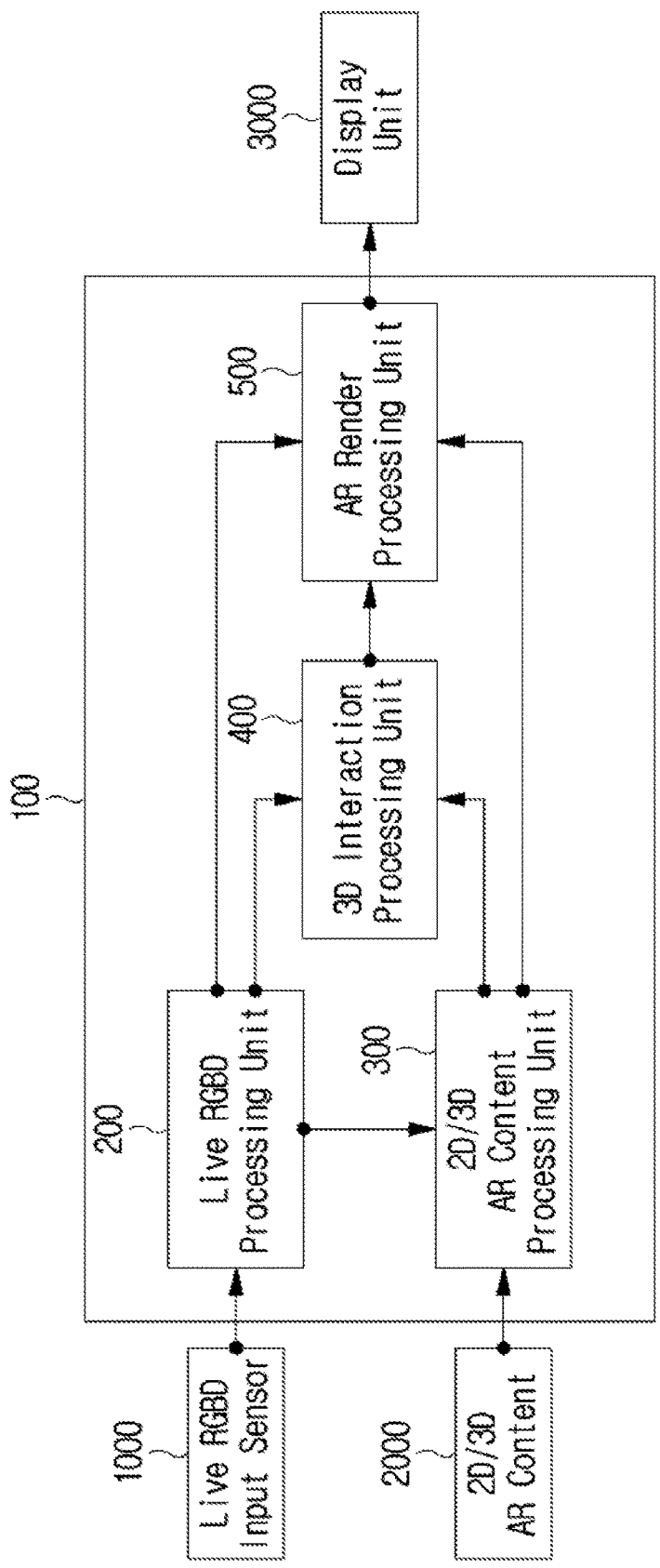
FIG. 1 is a view showing a block diagram of a configuration for a realistic 2D/3D AR experience service based on a video image.

Hereinafter, with reference to drawings, embodiments of the present invention are described in detail in a manner such that one of ordinary skill in the art may perform the embodiments without undue difficulty. However, as those skilled in the art would realize, the described embodiments may be modified in various different ways, all without departing from the spirit or scope of the present invention.

To avoid obscuring the subject matter of the present invention, while embodiments of the present invention are illustrated, well known functions or configurations will be omitted from the following descriptions. The drawings and description are to be regarded as illustrative in nature and not restrictive. Like reference numerals designate like elements throughout the specification.

In the present invention, when an element is mentioned to be "coupled" or "connected" to another element, this may mean that it is directly coupled or connected to the other element, but it is to be understood that yet another element may exist in-between. In addition, it will be understood that the terms "comprises", "comprising", "includes", and "including" when used in this specification, specify the presence of one or more other components, but do not preclude the presence or addition of one or more other components unless defined to the contrary.

In the present invention, the tams first, second, etc. are used only for the purpose of distinguishing one element from another, and do not limit the order or importance, etc., between elements unless specifically mentioned. Therefore, within the scope of the present invention, a first component of an embodiment may be referred to as a second component in another embodiment, or similarly, a second component may be referred to as a first component.

In the present invention, the components that are distinguished from each other are intended to clearly illustrate each feature and do not necessarily mean that components are separate. In other words, a plurality of components may be integrated into one hardware or software unit or one component may be distributed into a plurality of hardware or software units. Thus, unless otherwise noted, such integrated or distributed embodiments are also included within the scope of the present invention.

In the present invention, the components described in the various embodiments are not necessarily essential components, and some may be optional components. Thus, embodiments including a subset of the components described in one embodiment are also included within the scope of this invention. Also, embodiments that include other elements in addition to those described in the various embodiments are also included within the scope of the present invention.

According to the present invention, depth image information may be additionally obtained when filming AR content of an object to be synthesized as AR, which is filmed for an AR service based on a 2D approaching method. Herein, a method of additionally processing 3D information of the object to be synthesized as AR based on the depth information, and a method of associating 2D/3D AR content information with a position of a camera for an AR service and positions of an experiential space and a cybernaut are provided. Accordingly, a method of providing a realistic 2D/3D AR experience based on a video image may be provided even when performing synthesizing as AR for an image synthesized as AR using a 2D approaching method with a 2D video, the method being capable of enabling 3D interaction using a 3D approaching method in association with 3D information of the cybernaut.

In addition, in one embodiment, the present invention that will be described in below may reflect technical requirements in industries where augmented reality techniques, which are currently most popular in the digital content related technology field, are currently being commercialized in experience halls or theme parks by being applied to contents. In detail, according to the invention that will be described in below, 3D real experience service with high quality based on AR can be provided with short production time and low cost. Accordingly, it can be used directly in AR market among global VR (Virtual Reality) and AR markets. However, it is not limited to the above embodiments.

In one embodiment, an infrastructure in which an AR function is provided in an OS level may be secured in smart devices based Google Tango (launched in 2016) which integrates a RGBD sensor or in most of smart phones through Google AR Core and Apple ARKit (announced in 2017) based on a RGB sensor. The primary application field of the above infrastructure is determined to be the market for the entertainment contents service including the real experience field described in the present invention. Thus, it is expected to have sufficient market demand.

Hereinafter, embodiments of the present invention will be described with reference to accompanied drawings.

FIG. 1 is a view showing a block diagram of a configuration for a realistic 2D/3D AR experience service based on a video image. As shown in FIG. 1, the present invention may be configured with a live RGBD input sensor 1000, a 2D/3D AR content unit 2000, a realistic 2D/3D AR experience processing unit 100, and a display unit 3000.

In addition, the present invention may be specified to a realistic 2D/3D AR experience processing unit 100, and the above live RGBD input sensor 1000, the 2D/3D AR content unit 2000, and the display unit 3000 may be external configurations related to an operation of the present invention. In other words, the present invention may be an invention of a system including all of the above configurations. Alternatively, the present invention may be an invention including only the above realistic 2D/3D AR experience processing unit 100, but it is not limited to embodiments described above.

Herein, referring to FIG. 1, the live RGBD input sensor 1000 may sense a RGB video and a depth image of a cybernaut which are input for the AR service. The 2D/3D AR content unit 2000 may include a RGB video and 3D information by frames of the video which becomes an object to be synthesized as AR, and input from 2D/3D AR content filmed in advance. In addition, the realistic 2D/3D AR experience processing unit 100 may perform a realistic 2D/3D AR experience process based on a video image by receiving inputs from the live RGBD input sensor 1000 and the 2D/3D AR content unit 2000. In addition, the display unit 3000 may provide to the cybernaut a final augmented synthesized image.

Herein, in one embodiment, the live RGBD input sensor 1000 may use a sensor providing in real time a RGB color image and a depth image of the cybernaut such as a Kinect sensor of Microsoft, a RealSense sensor of Intel, etc. For body information, skeleton information describing movements of a body skeleton system may be directly obtained from a sensor or may be obtained by using a conventional depth image analyzing method of a sensor (e.g. "J. Shotton et al. Efficient Human Pose Estimation from Single Depth Images, IEEE Trans. On PAMI 2821~2840, 2013). In addition, a high quality RGB image input from a DSLR camera or video cam may be used as a RGB color image rather than using a RGB image of a RGBD sensor. A depth image may be obtained by, in addition to a method of patterning an infrared light area and a time of flight (TOF) method, a dual camera method using two RGB cameras, or a method of using a structure-from-motion or SLAM.

Herein, in one embodiment, it may be assumed that calibrations such as a relative rotation/movement relation between information representative coordinate systems or sensors according to a camera geometric calibration method of a computer vision field may be performed for an RGB image and a depth image, and skeleton information. Such a geometric calibration assumption may be generally implemented by using various geometric calibration methods of a corresponding field. By using geometric calibration information, a 3D position of a pixel corresponding to a depth image pixel within a color image in association with the depth image pixel may be calculated by using a depth value of each pixel of the depth image. In addition, 3D figure information represented on a 3D space may be calculated by combining depth, color, and skeleton information of the cybernaut in the coordinate system of the RGBD sensor by using relations between adjacent pixels. Herein, a number of image frames per second obtained in the RGB sensor and a number of image frames per second obtained in the depth sensor may be different, and when the number of image framed obtained in the depth sensor is different, a frame in which RGB and depth information thereof is obtained is used as a key frame, and a RGB frame in which depth information thereof is not obtained may use depth information of the key frame by using an interpolation method.

Figure 2:
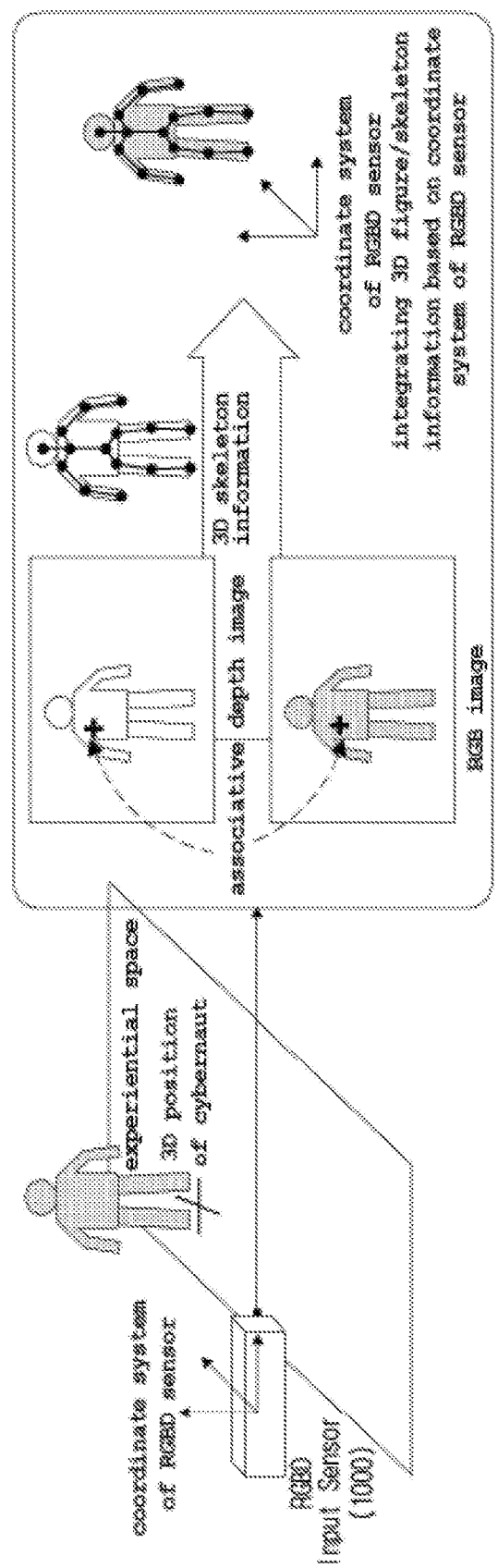
FIG. 2 is a view showing an example of processing RGBD information according to an embodiment of the present invention.

In one embodiment, referring to FIG. 2, 3D information of the cybernaut which is input for the AR service may be obtained by the live RGBD input sensor 1000. Herein, as described above, the live RGBD input sensor 1000 may obtain the 3D information of the cybernaut by using at least one of a RGB image, a depth image, and 3D skeleton information of the cybernaut. Herein, the 3D information may be information generated by integrating a 3D figure and the skeleton information of the cybernaut. In addition, the 3D information may further include 3D positional information of the cybernaut which is in consideration with the coordinate system of the RGBD sensor, but it is not limited to the above embodiments.

In addition, the cybernaut may be an object that is sensed by the live RGBD input sensor 1000. In other words, the cybernaut may be an object used as input information that is sensed for a realistic 2D/3D AR experience service. Hereinafter, for convenience of explanation, the present invention is described by using the term cybernaut, but it is not limited thereto. In other words, an object that may be sensed by the live RGBD input sensor 1000 may be identically used in the present invention, but it is not limited to the above embodiments.

Then, the 2D/3D AR content unit 2000, by using the live RGBD input sensor 1000, may film and store in advance images and videos of real persons (e.g. a K-pop star, etc.) and backgrounds which will be provided to the cybernaut through an AR service by an AR provider. In addition, depth information of a 2D RGB video image and an object area to be synthesized as AR for each frame of the video image may be stored as a result by processing the filmed images. Herein, in one embodiment, when an object to be synthesized as AR is a human body, the 2D/3D AR content unit 2000 may include 3D information of the corresponding body such as skeleton information for each frame.

In addition, in one embodiment, an object that is provided as an AR service may be expanded to other objects in addition to real persons. In other words, the object may be identically applied to an object that may be represented as AR content, but it is not limited to the above embodiments. In one embodiment, animals or other things may be provided as AR content. In detail, for example, animal experiences or things such as baseball, soccer, etc. may be provided as AR content. In other words, content that may be provided as an AR service may be identically applied to the invention that will be described below, and it is not limited to the above embodiments. However, in below, for convenience of explanation, the description is made based on a real person used as AR content, but it is not limited thereto.

Then, AR content is called in real time by the realistic AR experience processing unit 100 according to an AR service scenario. When the AR content is not a real person, and is a CG model such as famous animation character, etc., a 2D RGB video image may be also used by performing rendering for the same using a high quality rendering method in advance, and 3D information of a skeleton, or a low level appearance mesh model, etc. of characters used for rendering may be included.

In addition, referring to FIG. 1, the realistic 2D/3D AR experience processing unit 100 may include a live RGBD processing unit 200, a 2D/3D AR content processing unit 300, a 3D interaction processing unit 400, and an AR rendering processing unit 500. Herein, the live RGBD processing unit 200 may process image information that is obtained by filming the cybernaut. In addition, the 2D/3D AR content processing unit 300 may process 2D/3D AR content that is stored in advance to be matched with a position of the cybernaut. In addition, the 3D interaction processing unit 400 may control 3D interaction between the cybernaut and the AR content. In addition, the AR rendering processing unit 500 may finally modulate and match the AR content according to 3D interaction with 3D information of the cybernaut.

Figure 3:
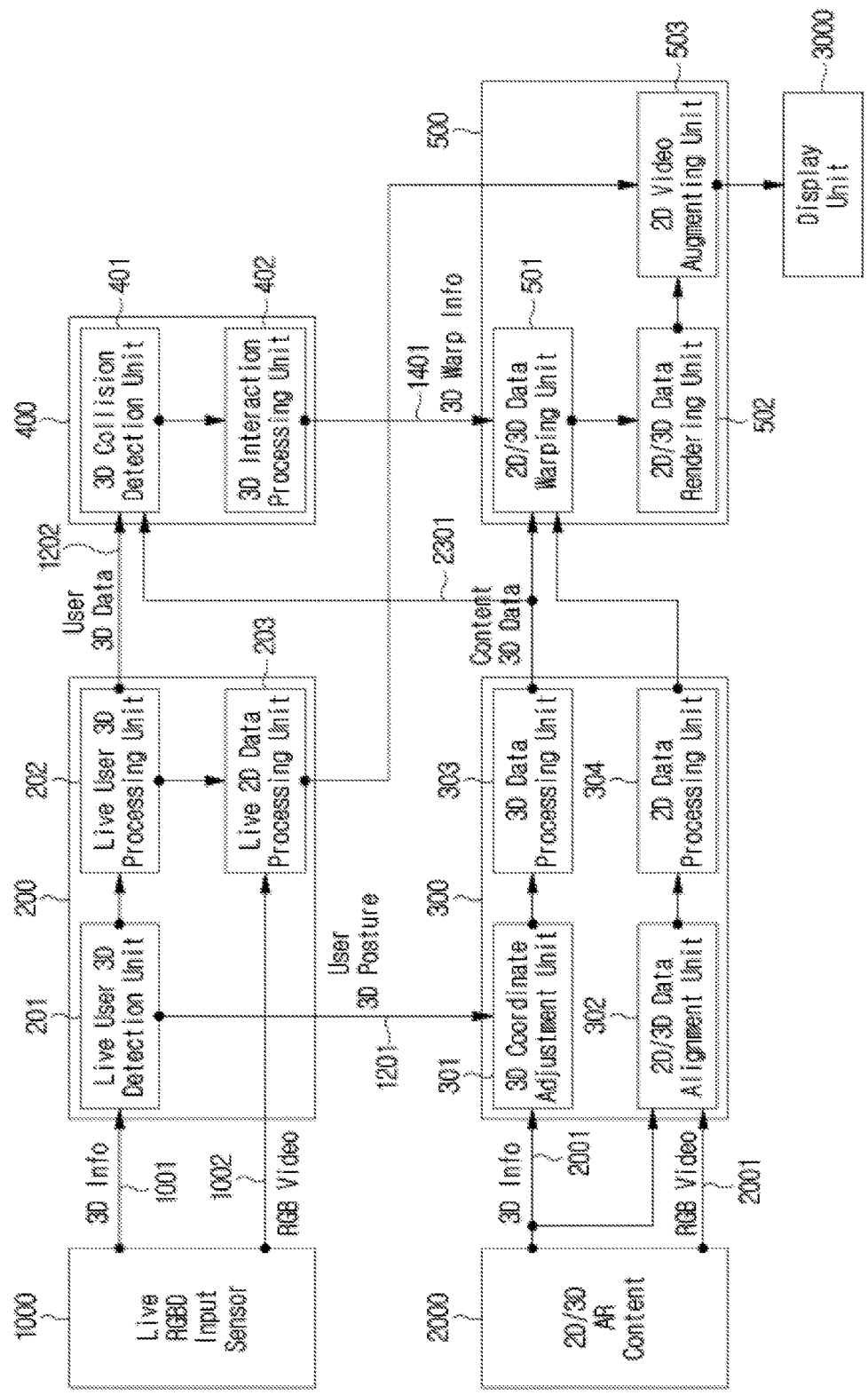
FIG. 3 is a view showing a block diagram of a detailed configuration for the realistic 2D/3D AR experience service based on the video image according to an embodiment of the present invention.

Each detailed configuration diagram of processing units of the realistic 2D/3D AR experience processing unit 100 may be configured as shown in FIG. 3, and will be described later. In order to describe detailed configurations of the realistic 2D/3D AR experience processing unit 100, a situation shown in FIG. 4 will be described as an embodiment. An experiential space of FIG. 5 may be a fixed type space that is arbitrarily set by a realistic AR experience service provider based on a fixed type RGBD sensor 1000, and will be described later. In addition, the experiential space may be a variable type space within a field of view (FOV) overlooked by a sensor based on a RGBD sensor of a photographer who films the cybernaut such as images by using a mobile type RGBD sensor. When the experiential space is a fixed type space, a coordinate system of the RGBD sensor filming the cybernaut and a coordinate system of the experiential space are different from each other. When the experiential space is a variable type space, the two coordinate systems may be identical or different, and the coordinate system of the RGBD sensor may be continuously changed by installing the RGBD sensor in a smart terminal. The coordinate system of the experiential space may be set at an arbitrary position, but for convenience of explanation, in below, it is assumed that the coordinate system of the experiential space is set based on the floor surface on which the cybernaut is actually positioned, but it is not limited thereto. A range of the experiential space may be pre-defined by a selection of the user based on a sensing range of the RGBD sensor used for AR experience or when filming the AR content.

The cybernaut may position at an arbitrary position on the experiential space defined as above. For a realistic AR experience service, 3D information such as RGB video, depth image and skeleton information, etc. of the cybernaut may be obtained by the live RGBD input sensor 1000 based on the coordinate system of the live RGBD input sensor 1000. In addition, a realistic AR experience content service provider may produce and digitalize in advance 2D/3D AR content of an object to be provided as AR content (e.g. a K-pop star, etc.) by using an AR content RGBD sensor similar to the live RGBD input sensor 1000 based on the coordinate system of the AR content RGBD sensor.

Herein, in one embodiment, the above live RGBD input sensor 1000 and the sensor of the 2D/3D AR content unit 2000 may be the same model. In another embodiment, the live RGBD input sensor 1000 and the sensor of the 2D/3D AR content unit 2000 may be different models, and it is not limited to the above embodiments.

In addition, in one embodiment, positions of the live RGBD input sensor 1000 and the sensor of the 2D/3D AR content unit 2000 may be identical based on the coordinate system of the experiential space. In another embodiment, positions of the live RGBD input sensor 1000 and the sensor of the 2D/3D AR content unit 2000 may be different based on the coordinate system of the experiential space. However, it is not limited to the above embodiments.

Herein, in one embodiment, data of the coordinate systems of the live RGBD input sensor 1000 and the 2D/3D AR content unit 2000 may be represented in a single coordinate system of the experiential space.

Figure 4:
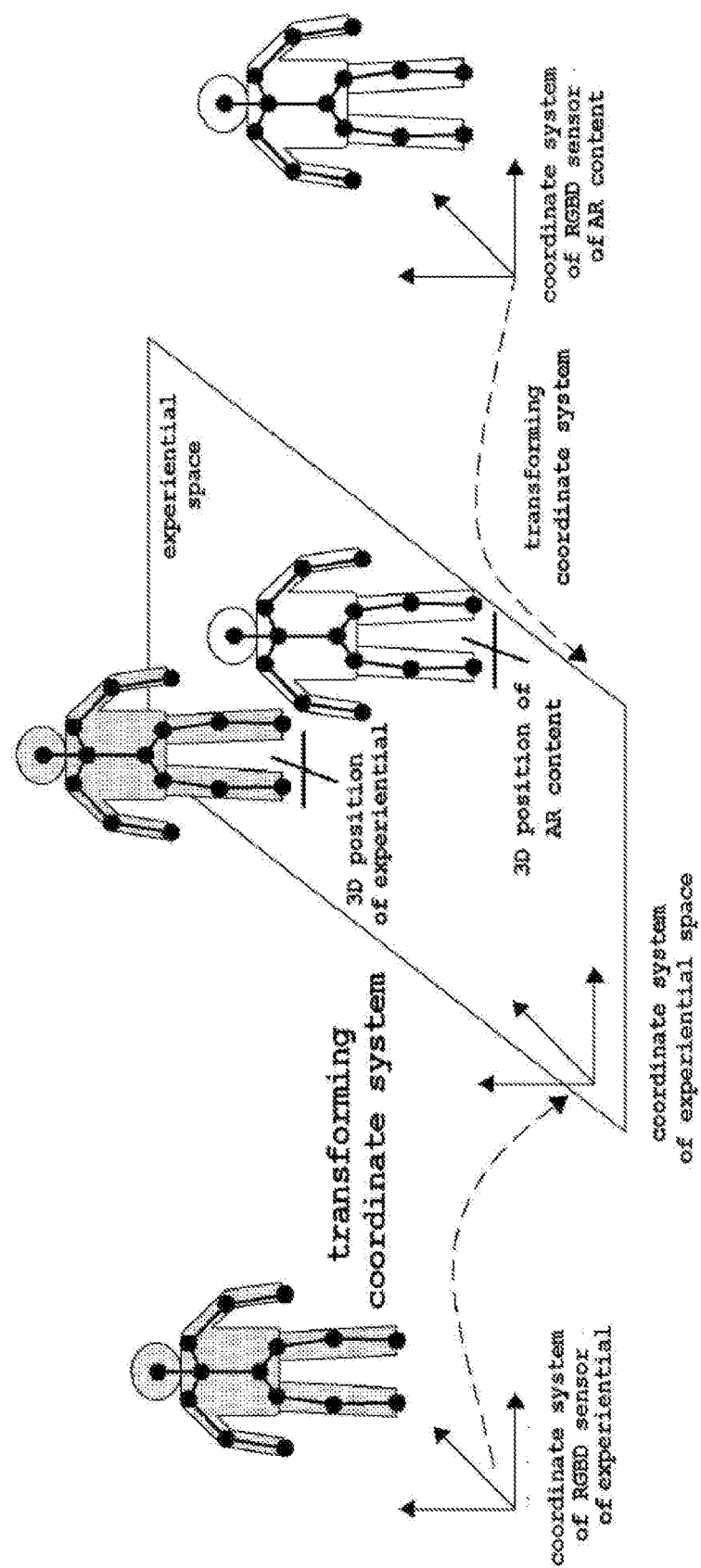
FIG. 4 is a view showing an example of 3D spatial transform between a coordinate system of a cybernaut and a coordinate system of AR content based on a coordinate system of an experiential space according to an embodiment of the present invention.

Referring to FIG. 4, data of the coordinate systems of the live RGBD input sensor 1000 and the 2D/3D AR content unit 2000 may be represented in a single coordinate system of the experiential space by using a coordinate system transform matrix with a coordinate system of the experiential space which may be obtained by using a conventional camera geometric calibration. Herein, when two RGBD sensors used for the live RGBD input sensor 1000 and the 2D/3D AR content unit 2000 are different, a process of transforming information such as internal and external geometric calibration factors, color space, etc. of the RGBD sensor used for filming AR content to be matched with the live RGBD input sensor 1000 may be performed based on the sensor of the live RGBD input sensor 1000.

Herein, referring to FIG. 4, when a position of the cybernaut is not adjusted in advance to a 3D position of the AR content which is based on the coordinate system of the experiential space, a 3D position of the cybernaut and the 3D position of the AR content may be different in the experiential space. In one embodiment, the above situation frequently occurs in a realistic AR experience service, such as taking photos with stars, which is provided in theme parks and based on a 2D approaching method. In other words, a method of generating an AR service situation by directly adjusting the position of the cybernaut by himself or herself, or limiting an experiential position to a specific point is used. Accordingly, by the above 3D positional disagreement, interaction UX (user experience) between the cybernaut and the AR content may not be natural.

Thus, in below, a method of reconstructing and adjusting in the above situation a 2D video of the AR content that is finally synthesized as AR to be matched with the 3D position of the cybernaut and the position of the RGBD sensor, and a method of processing 3D interaction are provided.

In more detail, referring to FIG. 3, the live RGBD processing unit 200 may be configured with a cybernaut 3D information detection unit 201, a cybernaut 3D data processing unit 202, and a cybernaut 2D RGB video image processing unit 203. The live RGBD processing unit 200 may calculate an image area of the cybernaut which will be synthesized as AR with a RGB image by using 3D information of the cybernaut within an experiential space. In addition, the live RGBD processing unit 200 may calculate dense 3D information of the cybernaut for 3D interaction with AR content. In another embodiment, the live RGBD processing unit 200 may calculate brief 3D information of the cybernaut for 3D interaction with the AR content. However, it is not limited to the above embodiments.

In detail, an operation of each configuration will be described. The cybernaut 3D information detection unit (=live user 3D detection unit) 201 may receive as input 3D information 1001 such as a depth image and skeleton information of the cybernaut from the live RGBD input sensor 1000. By using the same, the cybernaut 3D information detection unit 201 may detect a position of the cybernaut within an experiential space. Herein, as described above, the position of the cybernaut is calculated based on a 3D coordinate system of the RGBD sensor since the RGBD sensor is geometrically calibrated, or may be calculated based on a 3D coordinate system of the experiential space. In one embodiment, when the position of the cybernaut is represented based on the 3D coordinate system of the experiential space, each pixel depth value and skeleton information values of the depth image of the RGBD sensor may be calculated by using a rotation and movement transformation matrix between the coordinate system of the RGBD sensor and the coordinate system of the experiential space.

The cybernaut 3D information detection unit 201 may provide the detected position and posture information 1201 of the cybernaut within the experiential space to a 3D coordinate system adjusting unit 301 of the 2D/3D AR content processing unit 300. In other words, the cybernaut 3D information detection unit 201 may provide the posture information 1201 as information required for adjusting information of AR content that is based on a coordinate system used while filming the AR content. An associative relation of the cybernaut 3D information will be described later when describing the 3D coordinate system adjusting unit 301.

The cybernaut 3D information processing unit (Live user 3D Processing Unit) 202, in association with a HW operation ability, densely calculates where the cybernaut occupies within the experiential space by using depth intonation input from the RGBD sensor 1000 in a form of a mesh, a point cloud, or 3D information similar thereto. The above information where the cybernaut occupies may be used by the 3D interaction processing unit 400 for detecting a 3D collision with AR content and for processing interaction with the AR content.

Herein, in one embodiment, there may be a limit of operation ability in a smart-phone. Thus, in order to provide an AR service under a limited operational environment, the calculated dense information where the cybernaut occupies may be combined with skeleton information that is input together. Then, a bounding-box method or spherical-approximation methods may be used for approximating/simplifying the dense spatial occupation information of the cybernaut. Herein, the bounding-box method and the spherical-approximation method may be methods used for checking a collision with a neighbor character or environment in an animation in the field of computer graphics. Accordingly, the 3D interaction processing unit 400 may reduce a calculation amount, and easily perform the same.

In addition, in one embodiment, the dense spatial occupation information of the cybernaut may be calculated by simplifying using a 3D bounding-box method or a representative 3D plane method including the cybernaut. In addition, the dense spatial information occupation of the cybernaut may be approximated by modifying a length, posture, 3D figure information, etc. of a standard body character model by using the input depth information and skeleton information The dense spatial occupation information of the cybernaut obtained in the cybernaut 3D information processing unit 202 may be provided to the cybernaut 2D RGB video image processing unit (Live 2D Data processing unit) 203.

The cybernaut 2D RGB video image processing unit 203 may perform an operation of identifying an image area of the cybernaut as a foreground image, and remaining image areas as a background image within a RGB image by using a RGB video input from the RGBD sensor and the information of the dense spatial occupation information of the cybernaut input from the cybernaut 3D information processing unit 202. When identifying the image area of the cybernaut from a complex general background environment by using a Tri-map configuration method such as Graph-Cut rather than using a chroma-Key method, the dense spatial occupation information of the cybernaut input from the cybernaut 3D information processing unit 202 may be used as prior information of a foreground candidate area. The foreground image obtained as above may be used as an AR service according to a service type or may be provided as an AR service by matching a cybernaut image to a mixed reality within a virtual space. In addition, in one embodiment, occlusion may occur in the foreground image when providing interaction with AR content. Herein, when the occlusion occurs, which information among the cybernaut image and an AR content image is actually output through the display unit 3000 may be determined in a pixel unit. In one embodiment, criterion information for distinguishing occlusion or visibility may be provided by using 3D positional information obtained from a depth image corresponding to each foreground color pixel.

In addition, in one embodiment, when an AR service is provided by simply performing synthesizing as AR, the cybernaut 2D RGB video image processing unit 203 may not perform the above process for the input RGB video image 1002, and perform the next one.

In other words, as described above, the input RGB video image 1002 is not processed as described above, and the next process is performed when it is not a case of synthesizing as AR in consideration of occlusion between the cybernaut and AR content, or a case of synthesizing an AR content environment based on a mixed reality (MR) rather than synthesizing an environment of an AR service space. However, it is not limited to the above embodiments.

The 2D/3D AR content processing unit 300 may be configured with a 3D coordinate system adjusting unit (3D coordinate adjustment unit) 301, a 2D/3D data arranging unit (2D/3D data alignment unit) 302, an AR content 3D data processing unit 303, and a 2D data processing unit 304. Herein, the 3D coordinate system adjusting unit 301 may adjust a 3D coordinate system. In addition, the 2D/3D data arranging unit 302 may calculate 2D RGB information 2002 of an object to be synthesized as AR and 3D information 2001 such as depth information and skeleton information with a result of the live RGBD processing unit 200 by using AR content information and geometric calibration information of the RGBD sensor used when filming AR content, and store the same in a calculation memory. The AR content 3D data processing unit 303 may process data of the AR content. In addition, the 2D data processing unit 304 may modulate RGB image information of the AR content based on 3D information adjusted according to cybernaut positional information. Herein, as an example shown in FIG. 6, a 2D video image of the AR content and 3D information for 3D interaction information may be calculated based on information of the cybernaut, and a description thereof will be described later.

Figure 5:
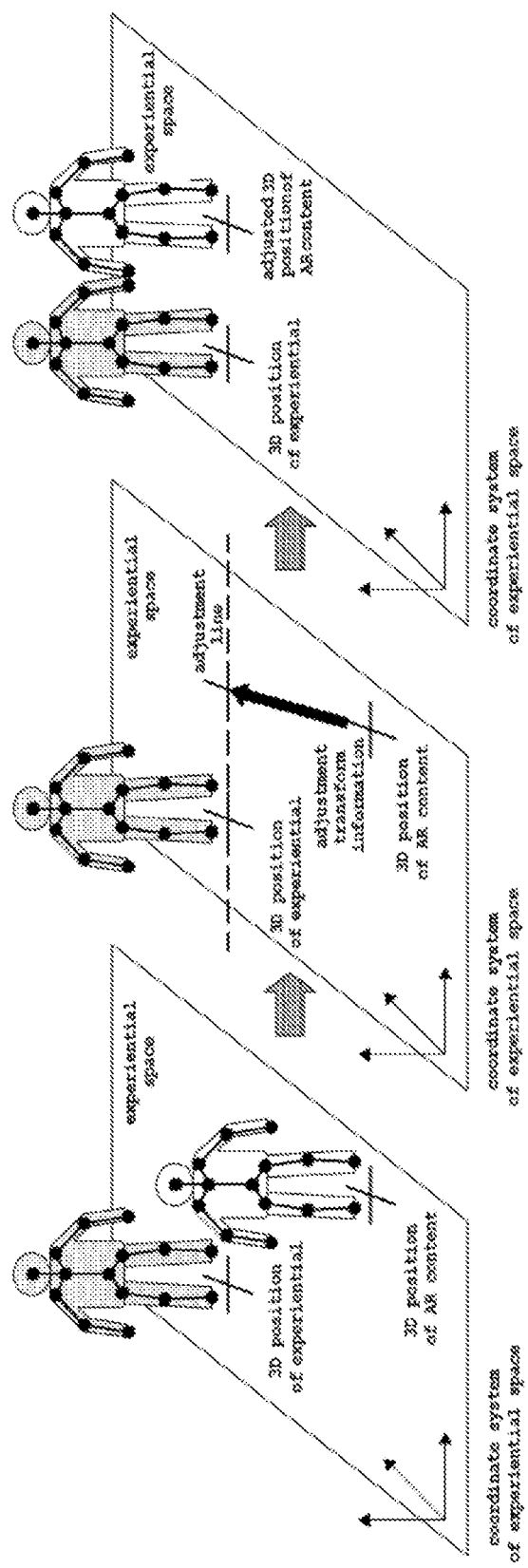
FIG. 5 is a view showing an example of adjusting a 3D coordinate system of the AR content using an adjustment criterion based on the cybernaut according to an embodiment of the present invention.

In detail, referring to FIG. 5, the 3D coordinate system adjusting unit 301 may perform calculation by using a 3D position of the cybernaut which is calculated in the cybernaut 3D information detection unit 201 and a 3D position of the AR content which is transformed into a coordinate system of an experiential space. Herein, the 3D coordinate system adjusting unit 301 may perform calculation by using information describing adjustment transform information about how the AR content has been adjusted according to an AR content service scenario based on the position of the cybernaut.

In one embodiment, the AR content service scenario may be as follows. When it is assumed as a scenario that the AR content automatically poses beside the cybernaut and takes a photo by 3D interacting with a posture of the cybernaut, the 3D coordinate system adjusting unit 301 may generate an adjustment line based on the position of the cybernaut as an example of FIG. 5. Herein, the 3D coordinate system adjusting unit 301 may calculate adjustment transform information by using a current 3D position of the AR content so that the AR content is positioned at the adjustment line with the cybernaut side by side.

The AR content 3D data processing unit 303 may update 3D information of the AR content so that the AR content is positioned beside the cybernaut as shown in FIG. 5 on a real digital experiential space. Herein, the AR content 3D data processing unit 303 may update the 3D information by applying adjustment transform information to 3D information such as depth image and skeleton information, skeleton-based spherical or bounding-box model, a 3D bounding-box, a representative 3D plane, etc. of the AR content which are pre-stored. Then, as a result, the AR content 3D data processing unit 303 may provide to the 2D data processing unit 304 the adjustment transform information of the finally updated 3D information compared to the input 3D information 2001. Accordingly, the 2D data processing unit 304 may use the above information when transforming information of a RGB video 2002. In the above process, when information such as skeleton-based spherical or bounding-box model, a 3D bounding-box, a representative 3D plane, low-resolution polygonal mesh, etc. is not pre-input as 3D information 2001 of the AR content to the cybernaut 3D information processing unit 202, the cybernaut 3D information processing unit 202 may simplify the 3D information for detecting and processing 3D interaction with the cybernaut by using the same method.

The 2D/3D data arranging unit 302 may calculate 2D RGB information and depth information, and skeleton information of an object to be synthesize as AR with a result of the live RGBD processing unit 200 by using AR content information and geometric calibration information of the RGBD sensor used when filming the AR content based on a coordinate system of the RGBD sensor used when filming the AR content, and store the same in the calculation memory. However, different to the live RGBD processing unit 200, a result of the cybernaut 2D RGB video image processing unit 203 may be pre-calculated and stored, and used by being loaded from the memory. In addition, in order to improve quality of AR content to be synthesized as AR, when filming an object to be synthesized as AR, filming is performed under a controlled environment such as chroma-key environment rather than a general environment so that a foreground area of the object to be synthesized as AR is also improved. In one embodiment, when filming a real person (e.g. a K-pop star), the 2D data processing unit 304 may perform the filming under a controlled environment such as chroma-key environment.

In addition to extracting skeleton information using depth information of the RGBD sensor, high quality skeleton information may be obtained in association with a professional motion capture apparatus. Foreground areal information of a 2D RGB image of AR content may include alpha blending information for processing natural synthesizing as AR such as the hair of K-Pop stars or boundaries of a silhouette.

The 2D data processing unit 304 may control collision processing based on 3D information of the cybernaut and 3D information of the AR content which is adjusted in the 3D data processing unit 303 according to cybernaut positional information. In addition, the 2D data processing unit 304 may perform pre-processing such that AR content is 2D/3D modulated and synthesized as AR according to a viewpoint of the live sensor which finally provides 3D interaction. In addition, as shown in FIG. 4, based on information arranged in the 2D/3D data arranging unit 302, for 3D modulation, the AR content may be represented in a 3D space by using depth information and a 2D video image. The 2D data processing unit 304 may perform a 3D modulation operation in association with the 2D/3D data warping unit 501 so that 2D data is synthesized as AR in a viewpoint of the live sensor of the cybernaut on the 3D space. Such a process may be performed in various methods in consideration of an operation ability of the arithmetic unit and a resolution of a display unit on which an AR service is provided.

In below, how AR content is processed in a viewpoint of the live sensor of the cybernaut in combination of the 3D data processing unit 303, the 2D data processing unit 304, and the 2D/3D data warping unit 501 will be described with some embodiments.

Figure 6:
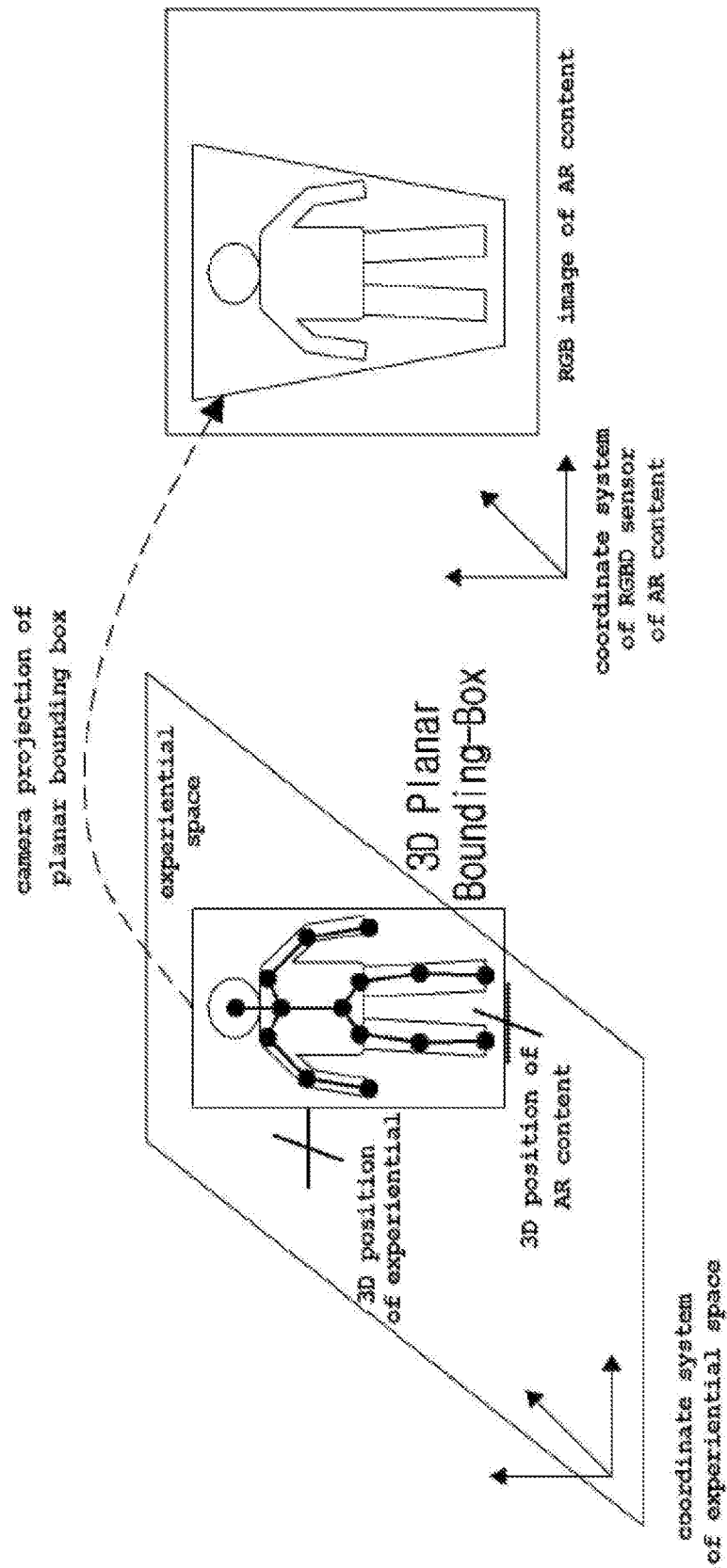
FIG. 6 is a view showing an example of processing a RGB image the AR content based on a 2D data planar bounding box according to an embodiment of the present invention.

In one embodiment, a method of easily implementing the same may be performed by using a method of generating a 3D virtual plane, registering an image for each frame of a 2D video in a texture map, and rendering the image on the plane. Herein, selecting a position and a size of the 3D plane is important, the position may be an average position of 3D spatial occupation of an object to be synthesized as AR when filming the AR content as shown in FIG. 6. In addition, the size of the 3D plane is determined by generating a 3D planar bounding box (hereinafter, 3D plane) on the 3D plane which tightly includes a real occupation size of the object to be synthesized as AR, the object being obtained based on geometric calibration information of the RGBD sensor when filming, and registering a RGB image area of the bounding box projected according to a camera projection model of the RGBD sensor such as Affine projection used when filming the AR content as a texture map of the 3D planar bounding box. In addition, when setting the 3D plane, in order to maximize an amount of visualization information, the 3D plane is arranged to be perpendicular to an experiential space, and arranged to face the camera from each other. Herein, four vertices of the 3D plane generated to register the texture map may be projected on a RGB image of the AR content by using an inverse-transformation matrix between the coordinate system of the RGBD sensor used when producing the AR content, and the coordinate system of the experiential space. An area obtained by connecting the projected four vertices may be registered as the texture map. In addition, when performing synthesizing as AR and alpha map information is included in a 2D RGB image for alpha blending so that boundaries are naturally synthesized, natural alpha blending effect may be calculated when a 3D rendering engine renders an image by registering alpha information as alpha map mask information of the texture map when registering the RGB image area as the texture map. However, since there is a difference between positions of the cybernaut and the object to be synthesized as AR, a position and a direction of the 3D plane is re-calculated according to a 3D transform formula by using adjustment transform information of the AR content 3D data processing unit 303, and the re-calculated position and direction of the 3D plane is projected on a 2D RGB image 1002 of the cybernaut by using an inverse-transformation matrix between the RGBD sensor and the experiential space. Accordingly, an RGB image of the AR content in which image transform through perspective is reflected may be obtained. As shown in FIG. 6, the cybernaut may experience an AR image (e.g. a K-pop star) that is actually located next him or her through the display unit. By using the above implementation method, a highly realistic synthesis as AR may be achieved with a low calculation amount. However, according to a posture of the object to be synthesized as AR, when an actual spatial occupation of the object to be synthesized as AR is distributed in a normal direction and a vertical direction of the generated 3D plane (for example: behaviors of widening the arms standing on the side of sensor), or when a difference between position/angle of the RGBD sensor used when filming the AR content and position/angle of the RGBD sensor of the AR service is large, image transform quality may be distorted.

As another implementation method, a 3D vertex for each pixel constituting a foreground image of AR content is generated by using 3D positional information re-calculated for each pixel by the 3D data processing unit 303, a 3D local mesh model configured in a square or triangle form is generated by using correlation information with adjacent pixels, and RGB image areas associated when a topology of the mesh mode is projected to an RGB image of the AR content are registered as the texture map by using an inverse-transformation matrix between the coordinate system of the RGBD sensor used when producing the AR content and the coordinate system of the experiential space. Then, positions of the vertices constituting the mesh model are 3D transformed by using adjustment transform information calculated in the 3D coordinate system adjusting unit 301, the transformed mesh model is 3D rendered and synthesized as AR with a viewpoint of an RGB image of the cybernaut. Accordingly, as shown in FIG. 5, the cybernaut may feel an AR effect such as the object synthesized as AR being positioned beside him or her. In addition, as the method described before, when alpha map information is included in a 2D RGB image for alpha blending, alpha map mask information of a texture map is registered when registering the RGB image as the texture map. In the above implementation method, an amount of calculation is increased more than that of the prior 3D plane approaching method. However, the above method is not affected by a 3D spatial occupation form according to a posture or position of the object to be synthesized as AR when transforming a RGB image. In addition, there is no image distortion according to a difference in viewpoints of the sensor when filming the AR content and when providing a live AR service.

Herein, when viewpoints of sensors used when filming the AR content and when providing a live AR service are different and 3D information of the 3D meshed AR content is rendered in the viewpoint of the live sensor, information that was not shown while filming the AR content may be shown when the AR content is provided live. Herein, the cybernaut may see a hole in the AR content that is synthesized as AR. In order to solve the above problem, the AR content may be generated in a single global mesh model by using all of RGB and depth images of each frame that is unfolded in a time axis, and correlation for each frame which describes modification relation between the global mesh model and a local mesh model of each frame according to movements of a real person (e.g. a K-pop star) within the AR content may be determined. By using the above correlation, color information of a corresponding mesh which was not shown by occlusion in a specific frame for each mesh of the global mesh model may be obtained from a frame having another visibility of the time axis. The above global mesh model may be provided by being calculated in off-line after filming the AR content. Alternatively, when necessary, the global mesh model may be calculated while providing a live AR service.

By implementing the above global mesh model, color information of a corresponding pixel in which a hole is generated when current AR content is synthesized as AR in a viewpoint of the live sensor may be determined in the global mesh model, and the determined color value is used when synthesizing as AR. Accordingly, the cybernaut may see colored AR content in a corresponding viewpoint rather than seeing the hole.

In addition, in another embodiment, a surfel rendering method may be used. A surfel may be generated at a 3D position of each pixel constituting a foreground image of AR content, and normal information of the surfel may be set by using 3D information of adjacent pixels. Then, color texture information may be registered for each surfel by projecting an area of the surfel which has a predetermined radius on a RGB image. Then, each surfel is 3D transformed and rendered according to a live viewpoint of the cybernaut. Accordingly, the cybernaut may experience an AR effect as if the AR content were interacting with him or her in the same space. The above method may solve the image distortion problem generated when a difference of viewpoints of the AR content and the live sensor becomes large according to the first method using 3D plane approximation method. The hole problem generated according to a viewpoint difference in a method based on a local mesh model which is the second method may be solved by adjusting the radius of the surfel and the normal information according to the viewpoint difference between two sensors by using optimizing methods.

In addition, in another embodiment, a method of using a light field sensor may be used. An AR service may be provided by defining a viewpoint and focus according to the live sensor, generating an image of the corresponding viewpoint and applying the above method.

As mentioned above, the 2D data processing unit 304 corresponding to a pre processing unit and the 2D/3D data wrapping unit 501 corresponding to a post processing unit may be configured with various embodiments.

The 3D interaction processing unit 400 operating between the cybernaut and the AR content modifies 3D information of the AR content according to a 3D spatial position of the cybernaut by using the 3D coordinate system adjusting unit 301 and the AR content 3D data processing unit 303, and processes interaction by comparing the modified 3D information of the AR content with 3D information of the cybernaut in the experiential space under the coordinate system of the experiential space.

The interaction processing unit 400 may be configured with a 3D collision sense processing unit (3D collision detection unit) 401 for checking whether or not the cybernaut artificially requires 3D interaction based on the 3D information of the AR content in which the 3D information is adjusted based on the cybernaut, and a 3D interaction processing unit 402 generating interaction by using 3D interaction pre-defined in the AR service according to an intention of the cybernaut when a collision process is generated.

First, the 3D collision sense processing unit 401 may check a collision between information such as skeleton-based spherical or bounding box model, a 3D bounding box model, a representative 3D plane, etc. which are generated in the 3D information processing unit 202 of the cybernaut side and the 3D data processing unit 303 of the AR content side. Herein, when a collision occurs, 3D collision type information may be transmitted to the 3D interaction processing unit 402. Checking the collision may be performed by checking whether or not 3D object units such as a sphere or bounding box, a low-resolution polygonal mesh, etc., which are configured by approximating a body appearance based on a skeleton, overlap on a 3D space. In one embodiment, when a 3D object unit that approximates a left hand included in a skeleton representing a skeleton structure of a left arm of the cybernaut collides with a right hand of the AR content, it may be determined that the cybernaut wants interaction, such as holding the hand of a real person (e.g. a K-pop star) of the AR content as the type information. Accordingly, collision type information corresponding to the same may be transmitted to the 3D interaction processing unit 402, and the 3D interaction processing unit 402 may provide to the cybernaut 3D interaction by synthesizing as AR content of taking a photo by holding the hand among 2D/3D reaction content prepared in advance according to the type information. Accordingly, 3D interaction based on a high quality image such as 2D/3D real person (e.g. a K-pop star) within real AR content may be provided to the cybernaut by using a 2D video image.

The AR rendering processing unit 500 may finally modify, match, and render the AR content according to the 3D information of the cybernaut and the 3D interaction, and provide the same to the display unit 3000. Herein, the AR rendering processing unit 500 may be configured with a 2D/3D data wrapping unit 501, a 2D/3D data rendering unit 502, and a 2D video matching unit (2D video Augmenting unit) 503.

The 2D/3D data wrapping unit 501 has been described with various embodiments associated with the 2D data processing unit 304, and is the same as described above. The 2D/3D data wrapping unit 501 arranges a 2D video image of the AR content on a 3D space according to a 3D spatial position of the cybernaut within the experiential space and according to a viewpoint of the live sensor, and may modify a position and direction in the 3D space according to a corresponding embodiment. 2D/3D data modified on the 3D space may be arranged to be associated with a real space on a content authoring tool and 3D rendering engine such as Unity3D.

The 2D/3D data rendering unit 502 may perform 3D rendering by including light effects by including an environment map arranging pre-defined light information of the experiential space within the content, or by including a light source (point/directional light source). In order to provide natural AR synthesized effects during the above process, the 3D data processing unit 303 may generate a natural shadow according to an arrangement of a real person (e.g. a K-pop star) within the experiential space by using information used when 3D spatially arranging 2D/3D data and arrangement light information. In one embodiment, when the 2D/3D data is arranged on a 3D plane, alpha map information of the 2D data may be used, and when a local mesh model is used, a realistic shadow may be generated by directly performing physics-based simulation for a corresponding mesh model. In a case of a 2D video image, when rendering the 2D video image, a natural lighting tone of the experiential environment may be reflected in a 2D video of the AR content by performing simulation of a color space of the 2D video according to a lighting environment of the experiential space by using color space transform information between a sensor used when producing the AR content and a sensor for the AR service, and lighting environment map information.

The 2D video matching unit 503 may synthesize as AR 2D video information input from the live input sensor 1000 and modified in the live 2D data processing unit 203, and the 2D video image of the AR content which is finally rendered in the 2D/3D data rendering unit 502 as a single image. Synthesizing as AR may be performed in consideration of occlusion by performing a visibility test for pixel information of a real cybernaut and a real person (e.g. a K-pop star) within the AR content of two video information based on dept information of two images.

The 2D video image that is finally synthesized as AR is provided to the cybernaut by using the display unit 3000, thus, by using the high quality 2D video image and 3D information of the AR content, the cybernaut may experience that he or she is beside the real person (e.g. a K-pop star) of the AR content by performing 3D interaction with the AR content.

When the display unit 3000 is a head mounted display (HMD) supporting optical see-through or video see-through, the AR rendering processing unit 500 may provide stereoscopic effect by expanding the above embodiment by using two virtual cameras set in association with a distance of the same space of the cybernaut and by using stereoscopic rendering method.

FIG. 7 is a view showing a flowchart of a method of providing an AR service.

In step S710, an AR service providing apparatus may obtain 3D information and 2D video information of a first object. Herein, as described in FIGS. 1 to 6, the AR service providing apparatus may be the realistic AR experience processing unit 100, and the live RGBD input sensor 1000, the AR content unit 2000, and the display unit 3000 may be external devices. In another embodiment, the AR service providing apparatus may be an apparatus including all of the live RGBD input sensor 1000, the AR content unit 2000, the display unit 3000, and the realistic AR experience processing unit 100 which are described above. However, it is not limited to the above embodiments.

In addition, in one embodiment, the first object may be the cybernaut described above. In other words, as described above, the first object may be an object that is sensed by the live RGBD sensor 1000, but it is not limited to the above embodiments. Herein, the AR service providing apparatus may obtain 3D information and 2D video information of the first object (that is, the cybernaut). Herein, in one embodiment, the 2D video information may be RGB video information of the first object. In addition, the 3D information may include at least one of depth image information and skeleton information.

Then, in step S720, 2D video information and 3D interaction information of AR content may be obtained based on the first object. Herein, as described in FIGS. 1 to 6, the AR content may be a real person. In addition, the AR content may be content set by a provider and is not limited to a real person. Herein, in one embodiment, the AR content may be AR content obtained from the AR content unit 2000. Herein, the AR content may include a RGB video that becomes an object to be synthesized as AR and which is input from the 2D/3D AR content obtained in advance, and 3D information for each frame of the input video. In other words, the AR content may include 2D video information and 3D interaction information. Herein, in one embodiment, the 3D interaction information may be 3D information. In other words, it is not limited to information for interaction Then, in step S730, the AR service providing apparatus may combine the 2D video information of the first object with the 2D video information of the AR content. As described in FIGS. 1 to 6, when a sensor for the first object (e.g. a live RGBD input sensor) and a sensor for the AR content (e.g. a sensor of the AR content unit) are different, coordinate systems used in respective sensors may be different. Herein, as described above, the two coordinate systems are transformed into the same coordinate system (e.g. a coordinate system of an experiential space). In other words, 3D space information of the AR content is transformed based on 3D space information of the first object. In one embodiment, the 3D space information is information determined at least one of a 3D position of an object, a posture of the object, an angle of the object, a direction of the object and a size of the object. In other words, the 3D space information indicates information of the 3D space related to the object.

More specifically, as described above, it is necessary to determine the 3D space information of the first object in order to receive the AR service irrespective of the position, the posture and the angle of the first object. Accordingly, the first object may be provided with an AR service even though the first object moves to a designated position.

In addition, in one embodiment, the information on the first object described above may be obtained through the first sensor, and the information of the AR content may be information on the second sensor. In one embodiment, the first sensor and the second sensor may comprise a camera. At this time, the first sensor and the second sensor may be different from each other in environmental information, which is information when acquiring information about each object. At this time, the environment information may be at least one or more of information about a position, an angle, and a direction distance when the sensor acquires information of the object. In one embodiment, the position of the camera, the distance and direction to the angle camera and the object may be the above-described environment information, and the present invention is not limited to the above-described embodiment.

In addition, in one embodiment, the 2D video information of the first object and the 2D video information of the AR content are combined based on the transformed coordinate system.

Then, in step S740, the AR service providing apparatus may output the combined 2D video information. Herein, as described in FIGS. 1 to 6, the AR service providing apparatus may output the combined 2D video information by using the display unit 3000. In addition, in one embodiment, the AR service providing apparatus may provide 3D interaction service with the 2D video information. In other words, a 3D interaction service related to the AR content may be provided to the first object (or cybernaut) based on the AR content combined by being transformed based on the coordinate system. Herein, the 3D interaction service may be provided at a position adjacent to the first object, but it is not limited to the above embodiments. Accordingly, the first object may be provided with the 3D interaction service based on the combined 2D video information.

The steps of a method or algorithm described in connection with the embodiments disclosed in the present specification may be embodied directly in hardware, in a software module, or in a combination of the two. The software module may reside in a RAM memory, a flash memory, a ROM memory, an EPROM memory, an EEPROM memory, a register, hard disk, a removable disk, a CD-ROM, or any other form of storage medium known in the art. An exemplary storage medium is coupled to a processor such that the processor can read information from, and write information to, the storage medium. Otherwise, the storage medium may be integrated with the processor. The processor and the storage medium may reside in an application-specific integrated circuit (ASIC). The ASIC may reside in a user terminal. Otherwise, the processor and the storage medium may reside as discrete components in a user terminal.

The method shown in the present invention is described as a series of operations for clarity of description, and the order of steps is not limited. When needed, the steps may be performed at the same time or in a different order. In order to implement the method according to the present invention, the steps may additionally include other steps, include the remaining steps except for some steps, or may include additional steps.

The various embodiments of the invention are not intended to be exhaustive of all possible combinations and are intended to illustrate representative aspects of the invention. The matters described in the various embodiments may be applied independently or in a combination of two or more.

In addition, the embodiments of the present invention may be implemented by various means, for example, hardware, firmware, software, or a combination thereof. In a hardware implementation, an embodiment of the present invention may be implemented by one or more ASICs (Application Specific Integrated Circuits), digital signal processors (DSPs), digital signal processing devices (DSPDs), programmable logic devices (PLDs), field programmable gate arrays (FPGAs), processors, controllers, microcontrollers, microprocessors, etc.

The scope of the present invention includes software or machine-executable instructions (for example, an operating system, applications, firmware, programs, etc.) that enable operations the methods according to the various embodiments to be performed on a device or computer, and a non-transitory computer-readable medium in which such software or instructions are stored and are executable on a device or computer.

What is claimed is:

1. A method of providing an augmented reality (AR) service, the method comprising:
    obtaining 3D information and 2D video image information of a first object;
    obtaining 2D video image information and 3D interaction information of AR content based on the first object;
    combining the 2D video image information of the first object with the 2D video image information of the AR content; and
    displaying the combined 2D video image information,
    wherein a 3D space information of the first object is determined based on the 3D information and the 2D video image information of the first object,
    wherein a 3D space information of the AR content is adjusted based on the determined 3D position of the first object, and
    wherein the 2D video image information of the AR content is combined with the 2D video image information of the first object based on the adjusted 3D space information of the AR content.

2. The method of claim 1,
    wherein the 3D space information of the first object includes at least one of a 3D position of the first object, a posture of the first object, an angle of the first object, a direction of the first object and a size of the first object,
    wherein 3D space information of the AR content includes at least one of a 3D position of the AR content, a posture of the AR content, an angle of the AR content, a direction of the AR content and a size of the AR content.

3. The method of claim 2,
    wherein the 3D space information of the AR content is adjusted based on the determined 3D space information of the first object when environment information of a first sensor obtaining the first object is different from environment information of a second sensor obtaining the second object.

4. The method of claim 2,
    wherein the environment information of the first sensor includes at least one of information related to a position, angle and direction where the first sensor obtains the information of the first object, and
    wherein the environment information of the second sensor includes at least one of information related to a position, angle and direction where the second sensor obtains the information of the AR content.

5. The method of claim 1, wherein the first object is provided with a 3D interaction service based on the 3D interaction information of the AR content.

6. The method of claim 5, wherein the 3D interaction service is a service provided in association with the combined 2D video image information.

7. The method of claim 1, wherein the 3D information of the first object is information obtained based on at least one of a depth image and skeleton information.

8. The method of claim 3, wherein when the first sensor and the second sensor are sensors different from each other, the 3D information and the 2D video image information of the first object is obtained based on a first coordinate system, and the 2D video image information and the 3D interaction information of the AR content is obtained based on a second coordinate system.

9. The method of claim 8, wherein the first coordinate system and the second coordinate system are transformed into the same third coordinate system, and the 3D space information of the first object and the 3D space information of the AR content are determined based on the third coordinate system.

10. The method of claim 1, further comprising: generating an adjustment line based on the 3D space information of the first object,
    wherein the 3D space information of the AR content is adjusted by the 3D space information of the first object based on the generated adjustment line.

11. The method of claim 10, wherein when the 3D space information of the first object is updated, the 3D space information of the AR content is automatically updated based on the updated 3D space information of the first object.

12. The method of claim 1, wherein the combining of the 2D video image information of the first object with the 2D video image information of the AR content includes: synthesizing as AR based on depth information of the 2D video image information of the first object and depth information of the 2D video image information of the AR content.

13. The method of claim 12, wherein the 2D video image information of the first object and the 2D video image information of the AR content are synthesized as AR in consideration of occlusion and visibility.

14. The method of claim 1, wherein the combined 2D video image information is displayed through a head mounted display (HMD).

15. An apparatus for providing an AR service, the apparatus comprising:
    a live RGBD processing unit;
    an AR content processing unit;
    a 3D interaction processing unit; and
    an AR rendering processing unit, wherein
    3D information and 2D video image information of a first object is obtained by the live RGBD processing unit, wherein a 3D space information of the first object is determined based on the 3D information and the 2D video image information of the first object,
    2D video image information and 3D interaction information of AR content is obtained by the AR content processing unit, wherein a 3D space information of the AR content is adjusted based on the determined 3D space information of the first object, and
    the 2D video image information of the first object and the 2D video image information of the AR content are combined by the AR rendering processing unit,
    wherein the 2D video image information of the AR content is combined with the 2D video image information of the first object based on the adjusted 3D space information of the AR content.

16. The apparatus of claim 15, wherein the live RGBD processing unit obtains the 3D information and the 2D video image information of the first object from a live RGBD input sensor, and the AR content processing unit obtains the 2D video image information and the 3D interaction information of the AR content from an AR content unit, and the 2D video image information generated by combining the 2D video image information of the first object with the 2D video image information of the AR content is output through a display unit.

17. The apparatus of claim 16, wherein when the live RGBD input sensor and the AR content unit use sensors different from each other, the 3D information and the 2D video image information of the first object is obtained based on a coordinate system of the live RGBD input sensor, and the 2D video image information and the 3D interaction information of the AR content is obtained based on a coordinate system of the AR content unit.

18. The apparatus of claim 17, wherein the coordinate system of the live RGBD input sensor and the coordinate system of the AR content unit are transformed into the same coordinate system of an experiential space, and the 3D space information of the AR content is adjusted by the 3D space information of the first object based on the coordinate system of the experiential space.

19. An apparatus for providing an AR service, the apparatus comprising:
 a live RGBD input sensor;
 an AR content unit;
 a realistic AR experience processing unit; and
 a display unit, wherein
 the realistic AR experience processing unit obtains 3D information and 2D video image information of a first object from the live RGBD input sensor, wherein 3D space information of the first object is determined based on the 3D information and the 2D video image information of the first object,
 the realistic AR experience processing unit obtains 2D video image information and 3D interaction information of AR content from the AR content unit, wherein 3D space information of the AR content is adjusted based on the determined 3D space information of the first object,
 the realistic AR experience processing unit combines the 2D video image information of the first object with the 2D video image information of the AR content,
 wherein the 2D video image information of the AR content is combined with the 2D video image information of the first object based on the adjusted 3D space information of the AR content, and
 the display unit displays the combined 2D video image information.

* * * * *